April 20, 1926.
S. G. RUSSELL ET AL
1,581,661
FISHING REEL
Filed Nov. 21, 1924
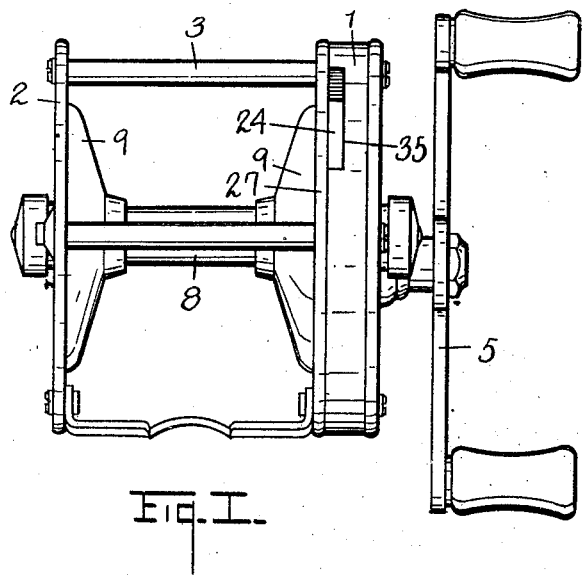
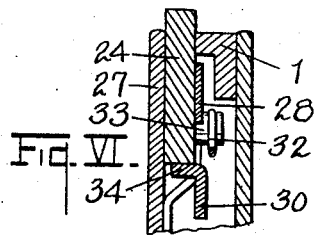
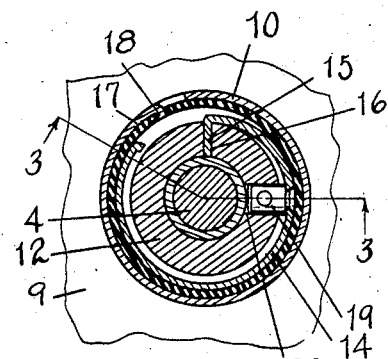
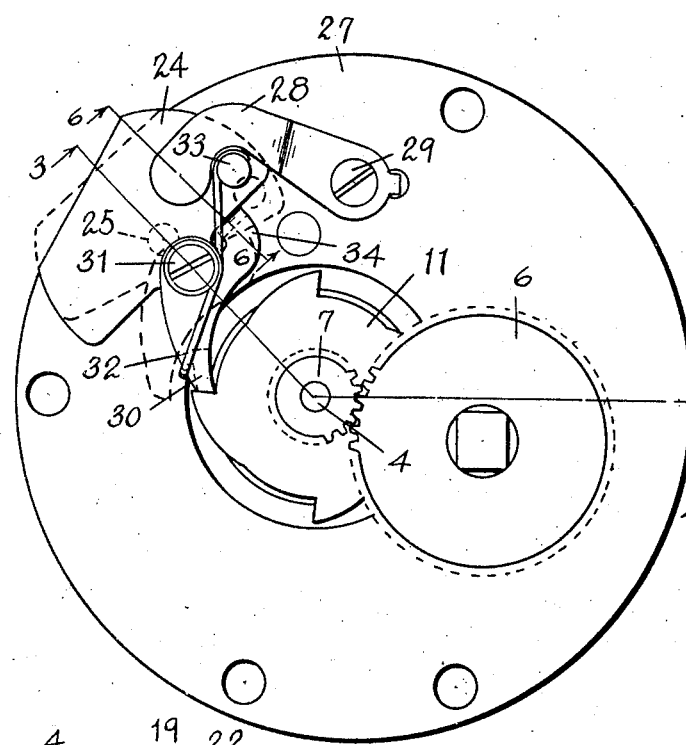
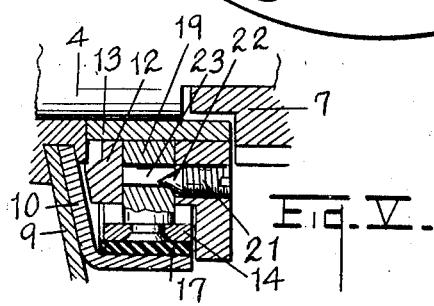
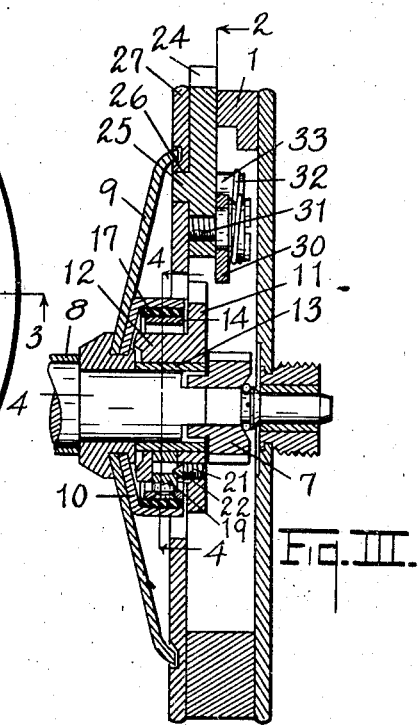
INVENTOR
Samuel G. Russell
Earle T. Clickner
BY
Chappell & Earl
ATTORNEYS Patented Apr. 20, 1926.

1,581,661

UNITED STATES PATENT OFFICE.

SAMUEL G. RUSSELL AND EARLE T. CLICKNER, OF KALAMAZOO, MICHIGAN, ASSIGNORS TO SHAKESPEARE COMPANY, OF KALAMAZOO, MICHIGAN.

FISHING REEL.

Application filed November 21, 1924. Serial No. 751,304.

*To all whom it may concern:*

Be it known that we, SAMUEL G. RUSSELL and EARLE T. CLICKNER, citizens of the United States, residing at the city and county of Kalamazoo, State of Michigan, have invented certain new and useful Improvements in Fishing Reels, of which the following is a specification.

This invention relates to improvements in fishing reels.

The main objects of the invention are:

First, to provide in a fishing reel an improved brake means.

Second, to provide in a fishing reel an improved brake means which is well adapted for heavy work such as deep water or ocean fishing.

Objects relating to details and economies of construction and operation will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this application, in which:

Fig. I is a rear view of a fishing reel embodying the features of our invention.

Fig. II is a detail view with parts of the frame removed, on a line corresponding to line 2—2 of Fig. III.

Fig. III is a detail view mainly in section on a line corresponding to line 3—3 of Figs. II and IV.

Fig. IV is a detail view on a line corresponding to line 4—4 of Fig. III.

Fig. V is an enlarged detail of the parts shown in Fig. III.

Fig. VI is a detail section on a line corresponding to line 6—6 of Fig. II.

In the drawing similar reference characters refer to similar parts throughout the several views, and the sectional views are taken looking in the direction of the little arrows at the ends of the section lines.

Referring to the drawing, the frame in the structure illustrated comprises the chambered head member 1, tail plate 2 and connecting pillars 3. As the details of the frame form no part of this invention they are not further described herein.

The spool shaft 4 is mounted in suitable bearings in the frame and is driven from the crank 5 connected to the driving gear 6 which meshes with the pinion 7 on the spool shaft. The spool comprises a tubular barrel 8 and end flanges 9 secured to the shaft to rotate therewith. At the head end of the spool, we secure a brake drum 10, this drum being arranged to face outwardly. The brake member 11, in the form of a ratchet, is provided with a hub 12 projecting into the drum. This brake member 11 is rotatably mounted on the shaft, it being provided with a bushing 13 in the structure illustrated.

The curved spring brake shoe 14 has an inturned end 15 engaged in the radial slot 16 of the brake shoe member hub 12. The drum has a lining 17 preferably of hard fibre, this lining being secured against rotation by a lug 18 struck inwardly from the drum. When the member 11 is free, it rotates with the spool. When, however, it is held against rotation, a friction braking action results.

We preferably provide means for adjusting the friction of the brake shoe, the means illustrated consisting of the pin 19 which is arranged in a recess 20 in the hub 12, the outer end of the pin being secured to the brake shoe.

An adjusting screw 21 is threaded into the brake member 11 and has a conical tip 22 engaging the hole 23 in the pin so that the friction of the brake shoe may be adjusted according to the strength of the line, it being the intent that it shall always be under the braking point of the line.

We provide manually adjustable means for locking the brake shoe member, this in the structure illustrated consisting of the pawl carrier 24 which is pivoted at 25 for rocking movement, the pivot being in the form of a stud on the pawl carrier engaging a hole 26 in the inner plate 27 of the head member of the reel frame. The stud is retained in its recess by means of the finger piece 28 which is mounted at 29 on the inner side of the plate 27 to overlie the inner side of the pawl carrier.

The pawl 30 is pivoted at 31 on the pawl carrier, the pivot 31 being eccentric relative to the pivot of the pawl carrier so that a rocking of the pawl carrier swings the pawl into and out of engagement with the ratchet.

The pawl is provided with a spring 32, one end of which is engaged with a stud 33 on the pawl carrier and the other with the pawl, the spring being coiled around the pivot of the pawl. A stop arm 34 of the pawl engages the edge of the carrier, thereby limiting the movement of the pawl on its pivot under the action of the spring. The pawl carrier is adapted as a finger piece projecting through a slot 35 in the frame.

With the parts thus arranged, the pawl carrier may be conveniently adjusted to engage the pawl and this engagement holds the ratchet against rotation and applies the brake.

In the preferred mechanical arrangement described herein, the braking action is operative only when the fish line is running out, thus providing an effective means for fighting the fish but leaving the entire winding mechanism free when the line is retrieved.

We have illustrated and described our invention in an embodiment which we deem very satisfactory. We have not attempted to illustrate or describe certain modifications and adaptations which we contemplate as we believe the disclosure made will enable those skilled in the art to embody or adapt our improvements as may be desired.

Having thus described our invention, what we claim as new and desire to secure by Letters Patent is:

1. In a fishing reel, the combination of a frame, a spool shaft, a spool on said shaft, a brake drum mounted at one end of said spool to face outwardly, a ratchet rotatably mounted on said shaft at the side of said drum and provided with a hub projecting into said drum, a curved spring brake shoe secured at one end to said hub to coact with said brake drum, said hub having a recess therein adjacent the point of attachment of the brake member thereto, an adjusting pin disposed in said hub recess, an adjusting screw disposed on said ratchet to coact with said pin whereby said brake shoe may be adjusted, a pawl carrier pivotally mounted on said frame and adapted as a finger piece, a pawl pivotally mounted on said carrier in an eccentric relation to the carrier pivot whereby the rocking of the pawl carrier swings the pawl to and from engagement with the ratchet, a spring for said pawl, said pawl being provided with a stop arm coacting with said pawl carrier for limiting the movement of the pawl under the action of its said spring, and driving means for said spool.

2. In a fishing reel, the combination of a frame, a spool shaft, a spool on said shaft, a brake drum mounted at one end of said spool to face outwardly, a ratchet rotatably mounted on said shaft at the side of said drum and provided with a hub projecting into said drum, a curved spring brake shoe secured at one end to said hub to coact with said brake drum, a pawl carrier pivotally mounted on said frame and adapted as a finger piece, a pawl pivotally mounted on said carrier in an eccentric relation to the carrier pivot whereby the rocking of the pawl carrier swings the pawl to and from engagement with the ratchet, a spring for said pawl, said pawl being provided with a stop arm coacting with said pawl carrier for limiting the movement of the pawl under the action of its said spring, and driving means for said spool.

3. In a fishing reel, the combination of a frame, a spool, a brake drum connected to said spool, a rotatably mounted ratchet brake member, a curved spring brake member secured at one end to said ratchet member to coact with said brake drum, said ratchet member having a recess therein adjacent the point of attachment of the brake member thereto, an adjusting pin disposed in said recess, an adjusting screw coacting with said pin whereby said brake shoe may be adjusted, a pawl carrier pivotally mounted on said frame and adapted as a finger piece, a pawl pivotally mounted on said carrier in an eccentric relation to the carrier pivot whereby the rocking of the pawl carrier swings the pawl to and from engagement with the ratchet, a spring for said pawl, said pawl being provided with a stop arm coacting with said pawl carrier for limiting the movement of the pawl under the action of its said spring, and driving means for said spool.

4. In a fishing reel, the combination of a frame, a spool, a brake drum connected to said spool, a rotatably mounted ratchet brake member, a spring brake member secured at one end to said ratchet member to coact with said brake drum, a pawl carrier pivotally mounted on said frame and adapted as a finger piece, a pawl pivotally mounted on said carrier in an eccentric relation to the carrier pivot whereby the rocking of the pawl carrier swings the pawl to and from engagement with the ratchet, a spring for said pawl, said pawl being provided with a stop arm coacting with said pawl carrier for limiting the movement of the pawl under the action of its said spring, and driving means for said spool.

5. In a fishing reel, the combination of a frame, a spool, a brake drum connected to said spool, a rotatably mounted ratchet brake member, a spring brake member secured at one end to said ratchet member to coact with said brake drum, said ratchet member having a recess therein adjacent the point of attachment of the brake member thereto, an adjusting pin disposed in said recess, an adjusting screw coacting with said pin whereby said brake shoe may be adjusted, a manually adjustable pawl carrier mounted on said frame, a pawl mounted on said carrier so that the adjustment of the pawl carrier moves the pawl to and from engagement with the ratchet, and driving means for said spool.

6. In a fishing reel, the combination of a frame, a spool, a brake drum connected to said spool, a rotatably mounted ratchet brake member, a spring brake member secured at one end to said ratchet member to coact with said brake drum, a manually adjustable pawl carrier mounted on said frame, a pawl mounted on said carrier so that the adjustment of the pawl carrier moves the pawl to and from engagement with the ratchet, and driving means for said spool.

7. In a fishing reel, the combination of a frame, a spool, a brake drum connected to said spool, a rotatably mounted brake shoe member operatively associated with said brake drum, a spring brake shoe mounted on said brake member to coact with said brake drum, an adjusting means for said brake shoe, manually operated means for locking said brake shoe member against rotation, and driving means for said spool.

8. In a fishing reel, the combination of a frame, a spool, a brake drum connected to said spool, a rotatably mounted brake shoe member operatively associated with said brake drum, a spring brake shoe mounted on said brake member to coact with said brake drum, manually operated means for locking said brake shoe member against rotation, and driving means for said spool.

In witness whereof we have hereunto set our hands.

SAMUEL G. RUSSELL.
EARLE T. CLICKNER.